2 Sheets--Sheet 1.

W. T. EASTES.
Harvester-Rakes.

No. 141,127. Patented July 22, 1873.

Attest
Harry Coleman
Jas. Jewell

Inventor
Wm. T. Eastes
Per A. H. & K. K. Evans
Attys.

2 Sheets--Sheet 2.
W. T. EASTES.
Harvester-Rakes.
No. 141,127. Patented July 22, 1873.
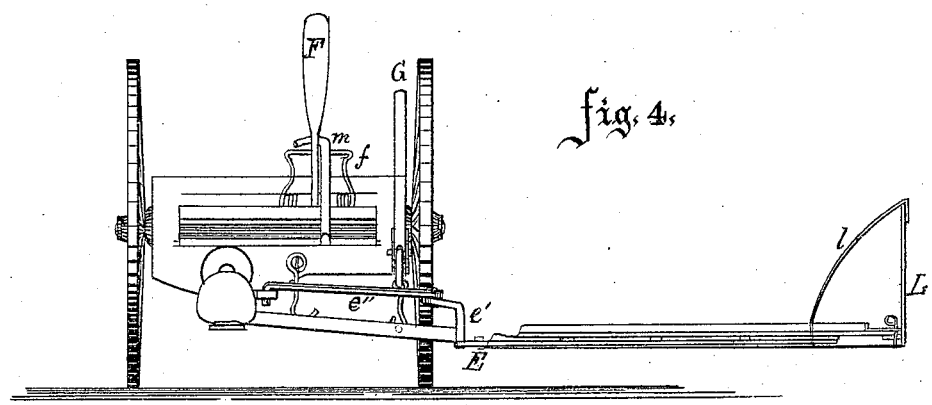
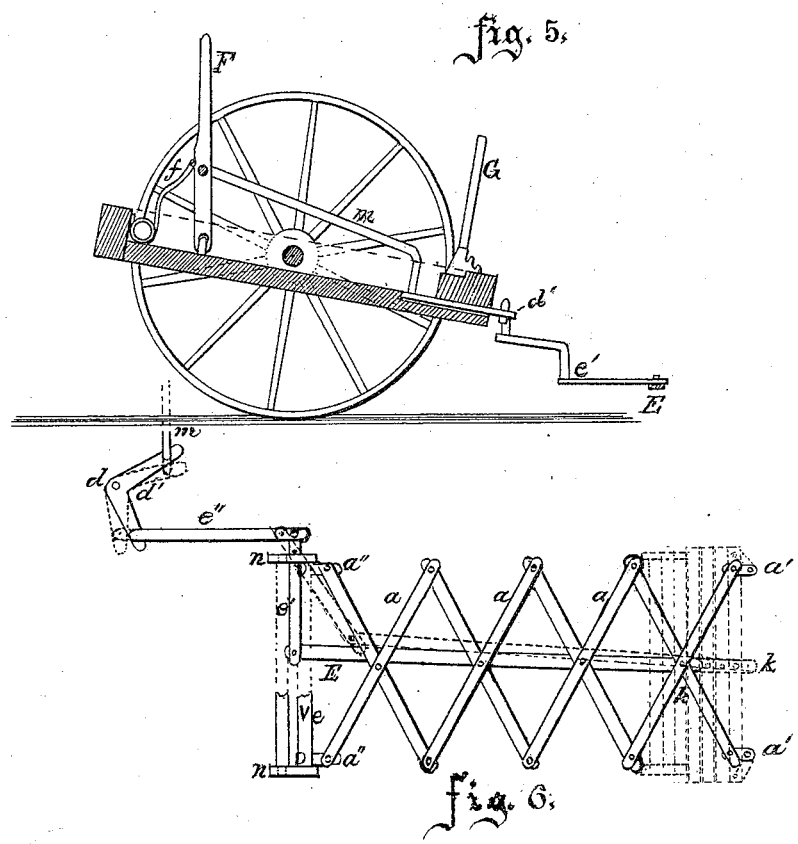

UNITED STATES PATENT OFFICE.

WILLIAM T. EASTES, OF SUMMITVILLE, INDIANA.

IMPROVEMENT IN HARVESTER-RAKES.

Specification forming part of Letters Patent No. 141,127, dated July 22, 1873; application filed June 23, 1873.

*To all whom it may concern:*

Be it known that I, WILLIAM T. EASTES, of Summitville, Madison county, and State of Indiana, have invented a new and Improved Harvester-Rake, of which the following is a clear, full, and exact description, reference being had to the accompanying drawings making a part of this specification, in which—

Figure 1:
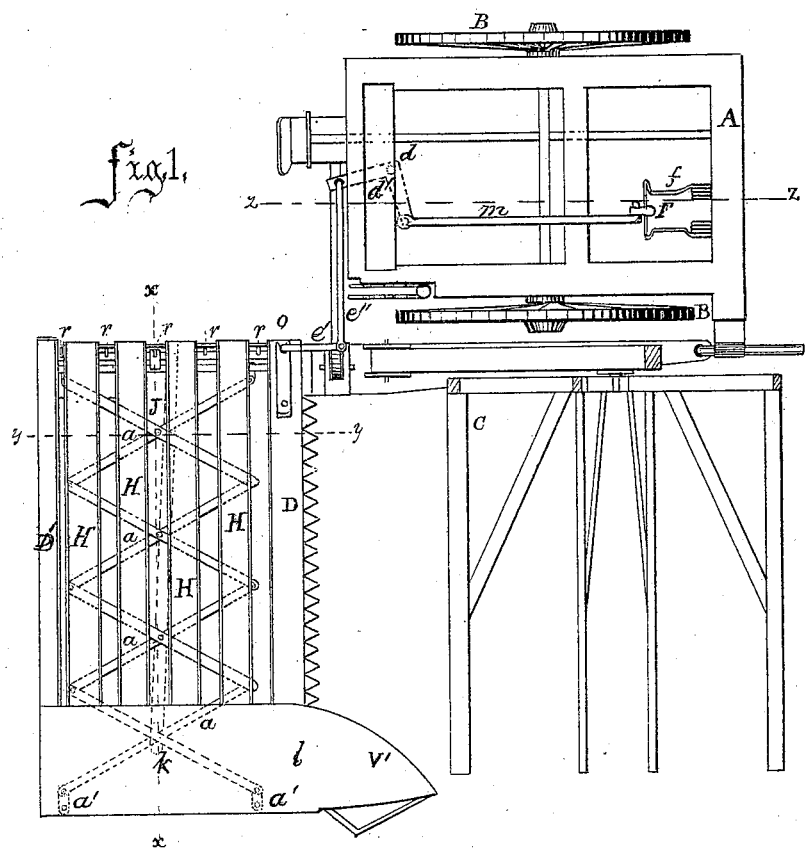
Figure 2:
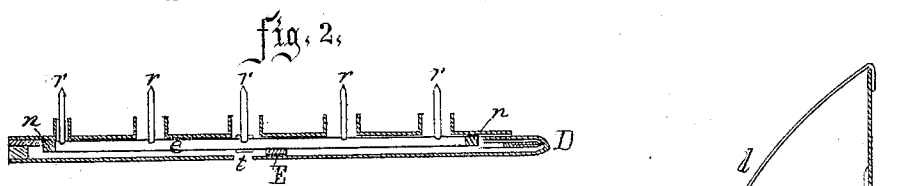
Figure 3:
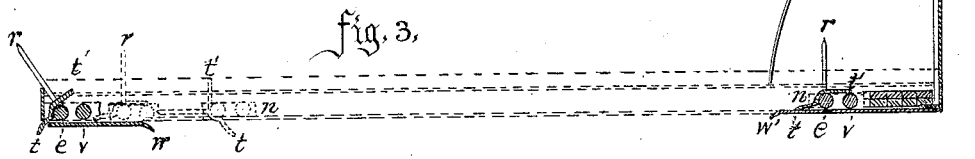

Figure 1 is a plan view of a harvester with the rake attached. Fig. 2 is a section through the line $y\ y$. Fig. 3 is a section through the line $x\ x$. Fig. 4 is a rear view of the machine. Fig. 5 is a section through the line $z\ z$, Fig. 1. Fig. 6 shows the construction of the rake and levers.

The object of my invention is to provide an automatic rake, which will remove the grain square from the table, and drop it in gavels directly in rear of the driving-wheels when rear-cut machines are used, and between the table and the adjoining drive-wheel when front-cut machines are used, and out of the way of the machine on its next round.

To enable others skilled in the art to make and use my invention, I will proceed to describe the exact manner in which I have carried it out.

The frame A and the driving-wheels B B are of the usual construction. G is a device for raising or lowering the cutter-bar D. The frame D' of the rake is covered by a number of slats, H, placed at a proper distance apart to give the rake-teeth $r\ r$ room to move to and fro between them. The slats H are strengthened at each edge by a slat secured edge upward to prevent swagging under the weight of the grain, the slats H thus resembling troughs, which permit the grain to be easily removed, sliding as the grain does only on the edges of these troughs, and allow ample room for the rake-levers $t\ t'$ to play and not catch the grain or straw.

The slats H composing the cover can be readily removed by first drawing the bolt $v'$ and removing the bent sheet $l$; then raising the rear corner of the cover and slipping out of the groove. The bent sheet $l$ prevents the grain from falling behind the teeth of the rake as the teeth recede to a point behind the bent sheet. The teeth $r\ r$ are firmly attached to the cross-bar $e$, which has its bearings in the slides $n\ n$ in which it has a partially-revolving movement, allowing the teeth to assume a vertical or horizontal position, as may be required. To the same slides $n\ n$ is rigidly attached the cross-bar $v$, thus forming a frame, in which the bar $e$ works. On the bar $v$ slide the self-adjusting clips $a''\ a''$, secured to the propelling-bars $a\ a$, which give motion to the rake-bar $e$. The rake-bar $e$ has two levers, $t$ and $t'$, that control the position of the bar, and consequently the position of the teeth.

Whenever the lever $t'$ is thrown back until it strikes the bar $v$ the teeth are in a vertical position, and this occurs during the process of removing the grain from the table or cover. When the gavel falls from the table the lever $t$ rests on the bottom until the rake recedes to $w$, (see Fig. 3,) thereby giving the teeth the power to separate the loose grain from the gavel, and at the same time moving it back on the table to prevent scattering. On reaching the point $w$ the lever $t$ loses its power by dropping into the slot J (see Fig. 1) in the bottom of the rake-table, thus allowing the rake-teeth to fall to a horizontal position, that they may recede under the cover or slats H to a point back of the bent sheet $l$, when the lever $t$ strikes against the point $w'$, throwing the lever $t'$ over on the bar $v$, and again bringing the teeth to a vertical position, ready to move forward and remove the next gavel.

The rake-bar is propelled by the combined slats $a\ a$, which are attached to the cross-bar $v$ by the self-adjusting clips $a''\ a''$, and to the table-frame by the flexible links $a'\ a'$. (See Fig. 1.) These links are so arranged as to allow the combined slats $a\ a$ to fold or unfold, as required. These slats are a combination of pieces of wood or other appropriate material, so attached together that they can be folded closely parallel to each other, or be made to unfold and assume an oblong position. The folding and unfolding of these bars (see Fig. 6) is accomplished by means of the bar E secured to the slats $a\ a$ at the point $k$, and operated by a combination of levers, which I will now explain: The bar E is attached to the double-armed lever $e'$ moving on a bolt or pivot at $o$, (see Fig. 1,) and this lever is connected by the rod $e''$ to the bent lever $d'$ working on the pivot $d$. (See Fig. 6.) Another rod, $m$, connects the bent lever $d'$ with the lever or treadle F, secured at its lower end to the driving-frame, and against which the driver places his foot to operate the rake. The spring $f$ presses against the opposite side of the lever F, and keeps it in position when not under pressure.

The operation of my rake is as follows: The harvester having cut a sheaf, the driver presses with his foot upon the lever F. The result is the bar E is caused to move up to the position shown in Fig. 6. In making this movement, it is evident the bar E will cause the combined slats $a\ a$ to unfold and throw forward the rake-bar, thereby removing the grain from the table. When the rake-bar has reached the side of the table the lever $t$ drops into a slot, as shown in Fig. 3, and while throwing off the sheaf it has inclination enough to keep back the loose straw and prevent it from scattering. The driver next releases his pressure on the lever F, when the spring $f$ forces the rod or bar E to the position shown in dotted lines in Fig. 6, which causes the slats $a\ a$ to fold, and carries back the rake-bar $e$ to a position in the rear of the bent sheet $l$, which is slotted to allow the bar to pass out with the teeth in a vertical position.

Having thus explained my invention, what I claim as new, and desire to secure by Letters Patent, is—

The slat-frame $a\ a$ with the sliding clips $a''\ a''$, the slides $n\ n$, the levers $t\ t'$, the links $a'\ a'$, and the slats H H, in combination with the bar $v$, rake-bar $e$, rod or bar E, lever $e'$, rod $e''$, lever $d'$, rod $m$, spring $f$, and lever or treadle F, all constructed and arranged substantially as and for the purpose set forth.

WILLIAM T. EASTES.

Witnesses:
JAMES N. ZEDEKER,
WILLIAM T. MARSH.